May 18, 1926.
W. C. LAUGHLIN
MACHINE FOR CONTINUOUS SEPARATION OF SOLIDS FROM LIQUIDS, OR LIQUIDS FROM LIQUIDS, AND METHOD OF SEPARATING THE SAME
Filed June 21, 1923
1,585,393
2 Sheets-Sheet 1
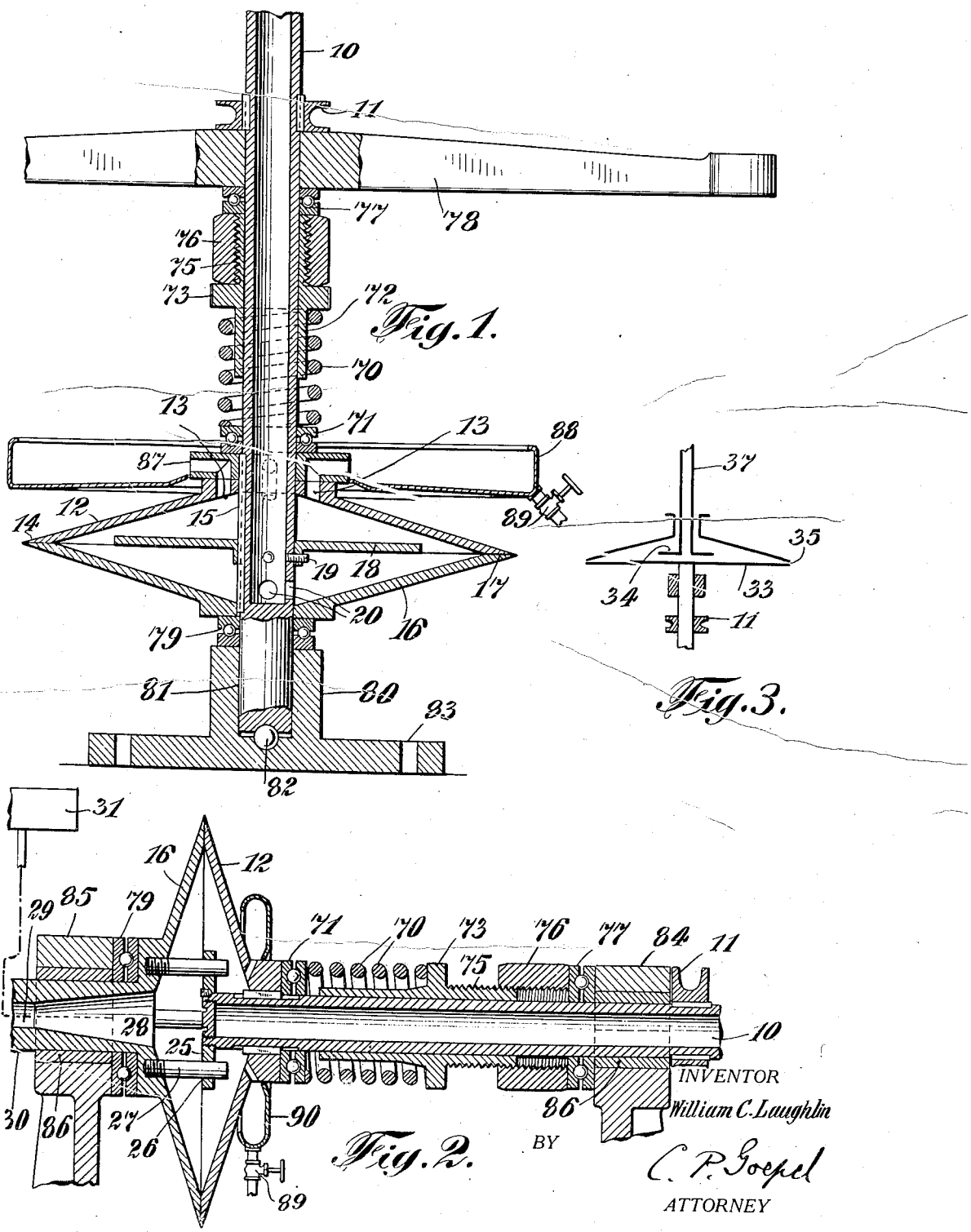

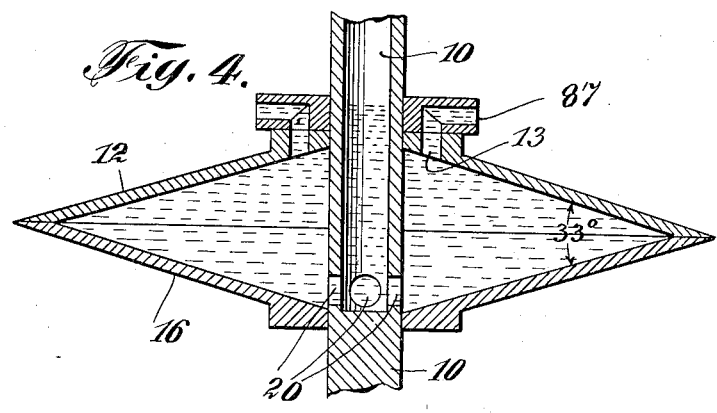
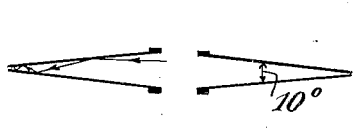
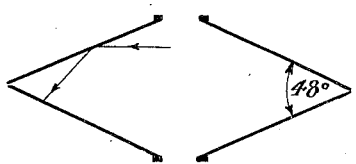
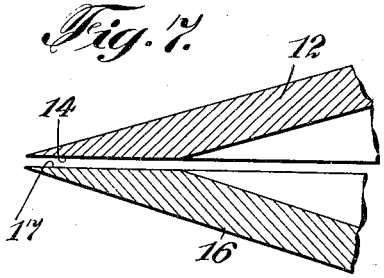
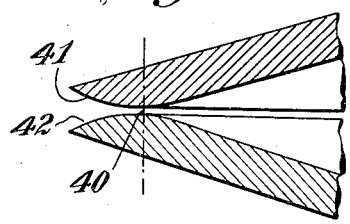
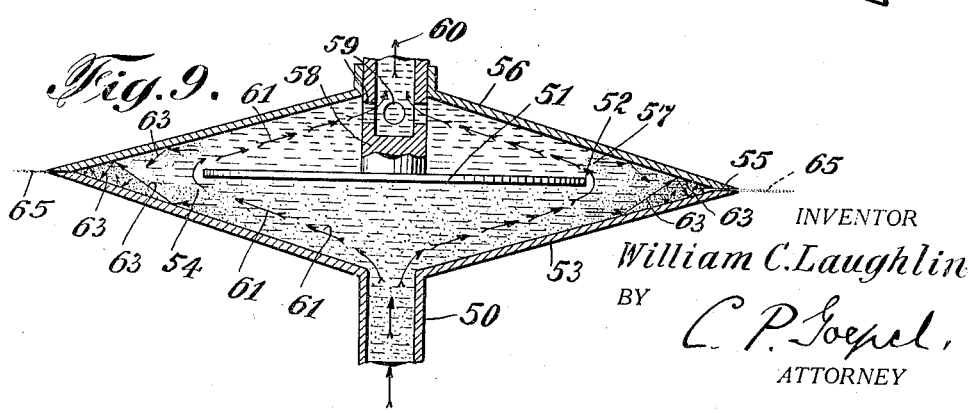

Patented May 18, 1926.

1,585,393

UNITED STATES PATENT OFFICE.

WILLIAM C. LAUGHLIN, OF GLENDALE, CALIFORNIA, ASSIGNOR TO LAUGHLIN FILTER CORPORATION, OF NEW YORK, N. Y., A CORPORATION OF DELAWARE.

MACHINE FOR CONTINUOUS SEPARATION OF SOLIDS FROM LIQUIDS, OR LIQUIDS FROM LIQUIDS, AND METHOD OF SEPARTING THE SAME.

Application filed June 21, 1923. Serial No. 646,810.

This invention relates to the art of separating solids from liquids, or liquids from liquids, and has for its object to provide efficient means and methods to accomplish such separation. For this purpose, the invention consists, among other things, in the application of the principle that bodies have different centrifugal forces, proportional to differences in their specific gravities under the same velocity. More particularly the invention consists of means for subjecting the materials to be separated to an effective zone of centrifugal forces in a continuous and uninterrupted manner, and simultaneously discharging the separated constituents in a continuous and uninterrupted manner. In embodiments of the invention, material to be separated is fed substantially at or near the axis of rotation to the interior of rotating bodies, after which part of the separated material is discharged at or near the axis of rotation, and another part of the separated material is discharged at the periphery of the rotating bodies.

The invention also provides a continuous separation, with the feeding and discharging also continuous. The adjustment is automatic for different materials, and also adjustable in regard to variation of the material itself.

It can be said that centrifugal forces vary substantially if not directly with the specific gravities of colloidal material. My invention includes also means specially adapted to colloidal separation.

A further object of the invention is to so guide the material that the various forces set in action act in unison towards a common end and not in opposition to each other. For this purpose, the rotating bodies are given definite angular relationship with each other to constrain the material in a conoidal configuration, also to avail of the advantageous wedge action of the separated materials, and the advantageous angular incidence and deflection, which is applicable also to vibratory or wave actions of the molecules. Also, a free unobstructed movement of the heavier separated constituent is important, for which reason, the contactual surfaces of the rotating bodies at the heavier constituent discharge are provided with substantially smooth surfaces both radially and circumferentially. To govern this discharge, a uniform pressure is exerted by these surfaces upon each other, by virtue of a preferably uniform acting spring, adjustable during the operation of the machine. In a preferable form, the material being treated is impeded by a plate rotating at the same speed with the rotating casing and preferably also the flow of material is opposite to the action of gravity. However this may be, the action of gravity is otherwise preferably availed of by having the material under treatment under a pressure proportionate to a column having a height equal to the distance of the length from the inlet point to the level of the feed tank.

Moreover, the invention comprises the treatment of the material to centrifugal forces while under enclosed casing fluid pressure whereby pressure is equal throughout or the kinetic energy of the molecules is transmitted throughout the interior of the casing.

The method consists also in subjecting materials having different specific gravities to rotation and to the action of centrifugal forces under constant current flow and enclosed fluid pressure, and simultaneously discharging the separated materials at different points. The method includes the constraining of the material being treated and rotated in a conoidal configuration the axis of rotation of which is coincident with the axis of generation, with the feed and one discharge co-axial and the other discharge peripherally of the configuration.

I will hereinafter describe several embodiments of my invention and describe the operation of the method and show embodiments of the same in the accompanying drawings, and finally point out the claimed invention in the annexed claims.

In the drawings—

Figure 1 is vertical central section of a vertical shaft machine embodying my invention;

Figure 2 is a vertical central section of a horizontal shaft machine embodying my invention;

Figure 3 is a central section of another form of vertical shaft machine;

Figure 4 is a section of the rotatable casing as shown in Fig. 1, but with the plate omitted;

Figure 5 is a diagrammatic view of one limit of the angular relation of the interior walls of the rotatable casing;

Figure 6 is a similar diagrammatic view of the other limit;

Figure 7 is an enlarged sectional view of the peripheral discharge;

Figure 8 is an enlarged sectional view of the peripheral discharge adapted for colloidal separation; and Figure 9 is a central section showing the operation and the entire contents of the rotatable casing under enclosed fluid pressure.

Similar characters of reference indicate corresponding parts throughout the various views.

Referring to the drawings, the shaft 10, which is arranged vertically, and the other parts accordingly, is keyed to a pulley 11 for rotating the shaft by any suitable transmission, or a turbine may replace the pulley. Any other means for rotating the shaft may be provided. To the shaft 10, a disc 12 is keyed by the key 15. The disc 12 is of conical shape obtained by moving a generatrix at an angle to the axis of rotation, and has flattened discharge ends at 14 in line with a plane at right angles to the axis of rotation. The disc 12 is provided with outlet channels 13 at or near the axis of rotation. To the shaft is keyed by the same key 15, a second disc 16 of substantially the same shape as the disc 12 excepting in reverse form having also flattened discharge ends 17, which match with the ends 14, so as to provide a smooth, uninterrupted and unobstructed contactual surface therebetween. The two discs include a space of conoidal configuration having its axis of revolution coincident with the axis of rotation of the machine. The two abutting surfaces are ground or otherwise prepared to provide a smooth contact without radial or circumferential obstruction. The interior surfaces of the discs 12 and 16 form a chamber and the walls thereof form with each other an angle of more than 10° and less than 50°; preferably about 35°, this being shown in the drawing. Within the chamber thus formed is a circular plate 18 having its lower surface in a plane at right angles to the axis of rotation and in line with the contacting surfaces of the discs when the same are in contact with each other. The plate 18 is keyed against rotation on the shaft 10 by the key 15, and rotates with the shaft. Thereby both discs and plates rotate at the same speed. The plate 18 does not extend to the disc periphery but leaves a space between the periphery of the plate 18 and the discharge opening surfaces 14 and 17. The shaft 10 is provided with a plurality of openings 20 at or near the axis of rotation thereof for supplying the interior of the chamber with the material to be treated, and these openings 20 act as discharge openings to the interior of the discs or the chamber formed thereby. The shaft 10 is hollow from the openings 20 upwardly and at its upper end is broken off in the drawings to indicate that its length may be extended upwardly, depending on the column pressure desired to be utilized. Or, the shaft can be connected with a coupling, in turn connected with a supply pipe leading to a reservoir at a suitable distance above the machine so as to utilize the gravity action, and the pressure obtained from a column of material. This is not shown as known devices can be used. The height of the column of fluid utilized can be determined by one skilled in the art.

In Figure 2, showing a horizontal shaft machine, the discs 12 and 16 have flattened contacts at their peripheries, also unobstructed both radially and circumferentially, as in Figure 1. The shaft 10 in Figure 2 is hollow and now receives the discharged constitutent instead of being used as a feeding means and has secured at one end within the chamber of the discs, a circular plate 25, having openings 26, for pins 27 secured to the disc 16. The plate 25 is movable in respect to the pins 27. The disc 16 is provided with a central channel 28 conically diverging inwardly, and connects with a central channel 29 of the shaft 30, and this channel is connected by suitable means to a pipe which extends to a reservoir 31, at a suitable distance above the machine to obtain the desired column pressure, which is calculated by multiplying the orifice area of the channel 28 by its depth below the level of the material in the reservoir 31. The treatment chamber between the discs 12 and 16 has a conoidal configuration, the center of gravity of which is the same as the material therein contained.

In Figure 3 a modified form is shown in which one disc 33 is flat and the other 34 is inclined in respect thereto at an angle which may not be less than 10° and not greater than 50°. The fluid supply is axial, and the discharge is peripheral on the one hand and substantially axial on the other. The plate 34 is secured to the shaft at the feed end of the shaft 37, and the material is fed directly upon the disc 33. The disc 34 and disc 33 are provided with flattened ends 35 to form contactual surfaces unobstructed circumferentially and radially.

In Figure 4 the parts described in connection with Figure 1 are shown, but the plate is omitted, so as to show that the device is operative without the plate, though better results with certain materials are obtained when the plate is used.

The flattened surfaces at the peripheral portions of the discs are shown in enlarged view in Figure 7 wherein the contactual surfaces are shown as separated and as parallel with each other.

For colloidal separation these flattened portions are modified to the extent of reducing their contactual surfaces, by rounding the same and enabling preferably a circumferential line contact to be obtained. The peak of the curved portion or contacting area is indicated by 40, and from here the surfaces flare outwardly in a radial direction as shown by the flaring surfaces 41 and 42. The resistance desired is of course less where dealing with substances in a colloidal state. This form of discharge is specially applicable to colloidal conditions.

Figures 5 and 6 show the extreme angular relationships which the interior walls of the discs can take. The minimum 10° is shown in Figure 5, since less is not practicable, and the maximum is less than 50°. This maximum is determined by the angle of incidence and reflection of a moving body in radial direction striking the inner wall. If the chamber angle is less than 50°, such a moving body will be impelled to strike the opposite inner wall, at an angle which will direct the body outwardly in general radial direction towards the periphery, rather than radially inwardly. In considering the angle of and deflection, the action of the centrifugal forces upon the moving bodies must be taken into consideration. Of course, the angular relations of one disc to the other can be varied in respect to a horizontal plane passing through the peripheral discharge and at right angles to the axis of rotation, but the requirement here is that the body will be generally directed outwardly radially instead of inwardly towards the periphery, as indicated by the arrows in Figs. 5 and 6.

In Figure 9 the material enters through the hollow shaft 50 against the action of gravity and is impeded by the circular plate 51, the perimeter 52 of the plate 51 contracting the fluid flow between the perimeter 52 and the disc 53 at about 54. The material is fed generally against the lower surface of the plate 51, which is in line with the line of contact of the peripheral discharge surfaces 55, or in the same plane. The perimeter 52 also contracts the fluid flow with the disc 56 at about 57. The plate is supported by a hollow shaft 58 provided with openings 59 through which the constituent of lesser specific gravity flows in the direction of the arrow 60. Hence the inlet is axial and the outlet is axial. The constituent of greater specific gravity is discharged peripherally and circumferentially of the discs 53 and 56, as indicated by 65. The approximate fluid flow within the casing is indicated by the arrows 61, and when the constituent of relatively heavier specific gravity reaches the effective centrifugal force zone, it is propelled radially outwardly towards the peripheral discharge. These are approximately indicated by the heavier shaded portions or dots. If any constituent strikes the disc, it is deflected in the manner indicated by the arrows 63, and the advantageous outward instead of inward movement results from the angular relationship of the inner walls of the discs. A smaller angle enables also a better wedge action of the heavier constituent into the space between the flattened surfaces and aids in forcing them outwardly therebetween against the action of the pressure of the discs one against the other. The angular disposition is such as to assist the heavier particles in the path towards the peripheral outlet, instead of hindering them. The entire interior is under fluid pressure, due on the one hand to the axial feed and axial discharge and also to some extent due to the action of the column of material from the feed end to the level of the reservoir. The feed being against the action of gravity, the interior fluid pressure is influenced thereby. The circumferential contraction at 54 serves to increase the speed of movement to bring the constituents quickly towards and into the effective centrifugal force zone, and the circumferential contraction 57 serves to reduce the speed so as to subject any constituent of heavier specific gravity which has not been thrown out to the action of centrifugal forces as long as possible.

In the machines described the feed is axial and the discharge of one constituent is peripheral and the other is axial or substantially axial.

In each case the discharge from the chamber continues so as to form a seal to the contents of the chamber as indicated in Fig. 4 in which the outlet openings are shown filled with fluid up to 87. Therefore, both the inlet and outlet of the chamber is sealed during the operation of the machine and the chamber is completely filled with the contents thereof under fluid pressure.

The plates are held against each other in a manner to give a uniformly distributed circumferential pressure one against the other which is of such a character as to be overcome by the heavier specific gravity material passing out between the contactual surfaces which forces the plates apart during the operation of the machine.

For this purpose, a helical spring 70 is provided which in Figure 1 surrounds the shaft 10 and has one end pressing against one disc 12, having a ball bearing 71 interposed between the plate and spring. The other end of the spring 70 passes over a movable sleeve 72 having a knurled sleeve 73 and a screw threaded portion 75 which is engaged by a sleeve 76 having an interior screw thread engaging the screw thread 75, acting against a ball bearing 77 which in turn abuts the frame 78 of the machine. The lower plate 16 rests on a ballbearing 79 which in turn rests upon a standard 80 having a tubular bearing 81, and an end or thrust bearing 82. Suitable bolt openings 83 are provided.

The general arrangement just described is the same in Fig. 2, excepting that the standards 84 and 85 are adapted for a horizontal shaft and are provided with bearings 86.

The spring 70 in Figs. 1 and 2 exerts a uniform pressure circumferentially upon the contactual discharge surfaces.

Surrounding the exit 87 of the discharge channels 7 in Fig. 1 is a pan 88 with a stop cock 89 to keep the discharge material separate from that passing out of the peripheral discharge. A similar pan 90 is provided in Fig. 2.

In the operation of the machines the speed of rotation in respect to the specific gravities of the materials to be treated can be mathematically calculated and after the material is inserted into the treatment chamber, one disc is adjusted with respect to the other by means of the spring tension so as to control the operability of the peripheral discharge of the discs. This can be readily adjusted at the beginning of the operation, and also sometimes requires adjustment during the operation, because material utilized in industries is not at all times of the same constituency.

The operation of the invention is as follows:

The centrifugal forces of the constituents of the material to be treated are calculated, to determine the speed to be applied to the discs. The speed is then selected which will permit the greater specific gravity material to be discharged at the peripheral discharge and the regulation of the adjustment is so made as to prevent the peripheral discharge of the material of lesser specific gravity. Such adjustment exerts a retarding effect upon the material which retarding effect is overcome by the heavier specific gravity material, but which is not overcome by the lighter specific gravity material, which latter is drawn or moved towards the axially located discharge end of the machine. As the material to be separated is fed into the inlet openings and into the space between the discs, the rotation thereof will throw out towards the peripheral discharge the material of greater specific gravity as its centrifugal force will be greater than that of lesser specific gravity and such heavier material will be discharged from the peripheral outlet. It is advantageous to have the constituent of heavier specific gravity reach the effective zone of centrifugal forces as quickly as possible, that is, without impedance, and to this end the inclined straight wall co-operating with the rotary plate, if any, serves to guide the heavier particles radially outwardly into the effective centrifugal force zone. At the same time, due to the contiguity of the perimeter of the rotary plate to the inclined wall the velocity of the material is increased which again assists in bringing the heavier particles radially outwardly. The heavier particles are then under the action of centrifugal force and also under the rotary action of the parts and are impinged radially outwardly preferably directly against the interior parts of the contactual surfaces of the discharge opening. But these particles that impinge the inclined straight wells are deflected therefrom and this deflection is such as to cause the heavier particles to move towards the contactual surfaces. So much of the particles as are collected at the peripheral peak of the conoidal configuration form a wedge like portion circumferentially extending around the discs and continued impingement of further separated particles against the base of this wedge like portion serves to force the peak of the wedge like portion into the space between the contactual surfaces. An advantageous shape of such wedge like portion is one radially permitting the entrance of the wedge peak into the space between the contactual surfaces but having a base of sufficient width to be utilized as an anvil for the impingement thereon of further particles. So also such further separated particles probably also create a wave effect which by molecular transmission gradually force the particles through the space of the contactual surfaces. The other constituents of the material, those of lighter specific gravity, are conducted under current flow towards the other side of the rotary plate, if any, and then towards the axis of rotation of the conoidal configuration. As the space between the straight line inclined disc and the perimeter of the rotary plate widens inwardly radially the speed or velocity of flow is somewhat decreased and this causes the heavier particles to remain as long as possible within the effective centrifugal force zone and the centrifugal forces act upon such heavier particles which may not have been separated, and causes these heavier particles to be thrown radially outwardly and into the deflecting angle zone, hence towards the space between the contactual surfaces, and outwardly in line with greatest diameter of the rotating fluid. By virtue of the chamber being filled at all times during the operation of the machine, the fluid pressure exists and this fluid pressure assists in causing the heavier particles to be separated from the lighter particles under the action of the centrifugal forces. Preferably the center of gravity of the fluid is the same as the center of gravity of the chamber or discs.

The operation is automatic in that the feed is continuous and the discharge is continuous, and in that the discs can be regulated during the operation of the machine. For instance, it may be desirable to withhold from discharge the centrifugal material for a time, so as to dry it still more, and in such a case the pressure between the discs is increased to such an extent as to keep the centrifugal material within the discs in proximity to the peripheral discharge, until so much has been accumulated as to force open the discharge ends, since with the accumulation of the material the centrifugal force acting thereupon will increase and thereby gradually overcome the pressure of the discs against each other. By this means varying degrees of moisture of the material to be peripherally discharged may be obtained. Such regulation is quite exact and it can be readily carried out. The discharge is continuous and passes out circumferentially of the machine in the nature of a circular ribbon.

The device described may be used to separate solids from liquids, or liquids from liquids, and may also be applied to the material in colloidal state, bearing in mind that such materials are slightly different than when solid and that the law that centrifugal forces increase with the increase of specific gravities requires slight modification, though it is approximately so.

For a particular machine for commercial operation I have found it satisfactory to have for a vertical shaft machine a shaft of 16 inches in height having a ¾ of an inch opening or bore for the inlet of the material with four outlet holes ⅜ of an inch equidistantly arranged, the rotary plate $\tfrac{3}{16}$ of an inch in depth, the discs $\tfrac{3}{16}$ of an inch thick with four discharge openings of $\tfrac{5}{16}$ of an inch, the chamber peak angle 33°, and the spring 2½ inches long of a ¼ inch stock. The other parts like the ball bearings can be adapted depending on commercial requirements. One form of ball bearing is 30 mm. with the lowermost thrust ball of ½ inch.

For the separation of solids from liquids, I have found a speed of 400 to 2000 revolutions per minute to give very advantageous results with a diameter of discs of between about 12 inches to 24 inches. As heretofore stated, the accurate speed of rotation must in each case be calculated dependent upon the material treated and preliminary tests can be made; as is the case in certain arts, prior to the continued use of the device.

My invention has application to the separation of slimes both colloidal and siliceous, or of a clayey nature, from water or solution as in the cyanide process or flotation process, or to flotation concentrates, which are very fine, from water; the separation of starch from water or solutions in the manufacture thereof; the separation of crystallized sugar from mother liquors; the separation of wood pulp from its sulphide solutions to the purification of water; in the separation of paints from the oils from which they are ground; in the food art as ketchup; in the separation of butter fat or other solid derivatives from the other milk constituents and many other or like uses which would be apparent to one skilled in the respective arts. It can also be used as a concentrator.

I have described a machine for the continuous separation of solids from liquids, or liquids from liquids, and their individual and separate discharge by the application of centrifugal forces and pressures and rotary forces and in certain instances by the aid of gravity, together with the discharge of the heavier specific gravity constituent through an automatically acting peripheral smooth discharge which is unobstructed radially and circumferentially and which is subject by external means to an adjustment counteracting the centrifugal force of the materials separated.

I have also described a new method of separating liquids from solids, or liquids from liquids, consisting generally of constraining the material to be treated in a conoidal configuration having its axis of revolution coincident with its axis of rotation and having the feed thereto co-axial and one discharge co-axial therewith and the other discharge peripherally thereof.

I do not desire to be limited to the particular embodiments herein shown or described, since they have been shown to indicate the spirit of my invention underlying the same and since changes may be made therein without departing from the spirit of my invention as defined in the appended claims.

This is a continuation in part of my application Serial No. 626,260, filed April 12, 1923.

I claim:

1. A machine for separating solids from liquids, or liquids from liquids, comprising two rotary plates facing each other having their peripheral surfaces smooth and unobstructed both radially and circumferentially and contacting smoothly circumferentially at all points thereof, a baffle located between said plates, means for uninterruptedly feeding to the space between the plates axially thereof material to be separated and discharging certain of said material between the plates substantially at or near the axis of rotation thereof, and a spring centrally disposed in respect to one of the plates for causing the peripheral portions of the plates to exert a uniform pressure upon each other around the peripheral circumference thereof, whereby the separated heavier constituent of the material separates the smooth peripheral portions of the plates against the uniform circumferential pressure of the spring, uninterruptedly with the continuity of the uninterrupted feed of the material to be separated.

2. In a machine for separating solids from liquids, or liquids from liquids, the combination of two rotary plates facing each other having their peripheral surfaces smooth and unobstructed both radially and circumferentially, and contacting circumferentially at all points thereof, said plates having straight conical interior walls, means feeding axially of the plates, material to be separated, means for discharging the lighter constituent of the material axially of the plates, a spring centrally disposed in respect to one of the plates for causing the peripheral portion of the plate to exert a uniform pressure upon the peripheral portion of the other plate around the peripheral circumference thereof, and means adjusting said spring during the rotation of the plates, whereby when a heavier constituent of the material separated from the other constituent passes between the smooth and unobstructed contacting parts of the plates, it separates the peripheral portions of the plates against the uniform pressure of the plates and is discharged from the plates.

3. The combination of two rotary disc like plates forming a chamber therebetween, and having contacting surfaces in line with a radial plane perpendicular to the axis of rotation of the plates, said surfaces having no obstructions either radially or circumferentially, a preliminary plate in said chamber movable with one of the plates longitudinally in respect to the other and rotatable at the same speed as said plates, means feeding substantially at or near the axis of rotation of the preliminary plate the material to be separated means discharging the lighter constituent axially of the plates, and means pressing the peripheral portion of one plate circumferentially uniformly upon the other, yieldable upon the separated constituent heavier passing between the flat contacting surfaces of the plates peripherally thereof, whereby when a heavier constituent of the material separated from the other constituent passes between the smooth and uninterrupted contacting parts of the plates, which separates peripheral portions of the plates against uniform pressure of the plates and is peripherally discharged from the plates.

4. In a machine for the separation of solids from liquids, or liquids from liquids, the combination of a plurality of plates having interior walls straight throughout their length and having smooth abutting peripheral end portions unobstructed radially and circumferentially for discharging the constituent of higher specific gravity at all circumferential points thereof, the interior walls being at an angle to the axis of rotation and forming an angle between themselves with its peak at the peripheral portions of the plates, a circular plate within the chamber between the abutting plates and adapted to rotate at the same speed of rotation with the abutting plates, and forming an angle with each of the interior walls of the abutting plates for constricting the material passing between the plate and the inclined walls, means for feeding the material to be separated to one side of the preliminary plate and substantially at or near the axis of rotation thereof, means for discharging the lighter constituent of the material at the other side of the plate and adjacent the axis of rotation of the plate, and means for yieldingly holding the peripheral portions of the plates in abutting relationship and yieldingly permitting separation of the peripheral portions by the heavier constituent discharging therefrom, whereby the heavier constituent opens the plates against the holding means.

5. In a machine for the separation of solids from liquids, or liquids from liquids, the combination of a plurality of plates having interior walls straight throughout their length and having smooth abutting peripheral end portions unobstructed radially and circumferentially for discharging the constituent of higher specific gravity at all circumferential points thereof, the interior walls being at an angle to the axis of rotation and forming an angle of not less than 10° and not more than 50° between themselves with its peak at the peripheral portions of the plates, means for feeding the material to be separated substantially at or near the axis of rotation thereof, means for discharging one constituent of the material adjacent the axis of rotation of the plates, and means for yieldingly holding the peripheral portions of the plates in abutting relationship and yieldingly permitting separation of the peripheral portions by the heavier constituent discharging therefrom against the action of the holding means.

6. Centrifugal separation apparatus comprising in combination, relatively separable walls cooperating to form a separating chamber and having contacting peripheral portions smooth and uninterrupted to form a continuous unobstructed peripheral discharge as the walls separate, means for holding the walls engaged in cooperating relation and adjustable to vary the pressure at which the walls will automatically separate to discharge through the continuous peripheral outlet, tubular shafting providing an axial inlet discharging into the chamber and a baffle within the chamber for directing the flow radially outwardly toward the peripheral discharge outlet.

7. Centrifugal separation apparatus comprising in combination, relatively separable walls cooperating to form a separating chamber and having contacting peripheral portions smooth and uninterrupted to form a continuous unobstructed peripheral discharge as the walls separate, means for holding the walls engaged in cooperating relation and adjustable to vary the pressure at which the walls will automatically separate to discharge through the continuous peripheral outlet, tubular shafting providing an axial inlet discharging into the chamber and a baffle carried by the hollow feed shafting and rotating within the chamber to carry the products from the axial inlet outwardly toward the peripheral discharge outlet.

8. Centrifugal separation apparatus comprising in combination, relatively separable walls cooperating to form a separating chamber and having contacting peripheral portions smooth and uninterrupted to form a continuous unobstructed peripheral discharge as the walls separate, means for holding the walls engaged in cooperating relation and adjustable to vary the pressure at which the walls will automatically separate to discharge through the continuous peripheral outlet, tubular shafting providing an axial inlet discharging into the chamber and a baffle within the chamber for directing the flow radially outwardly toward the peripheral discharge outlet, one of the walls defining the separating chamber having a discharge outlet in the axial portion of the same.

9. Centrifugal separation apparatus comprising in combination, relatively separable walls cooperating to form a separating chamber and having contacting peripheral portions smooth and uninterrupted to form a continuous unobstructed peripheral discharge as the walls separate, means for holding the walls engaged in cooperating relation and adjustable to vary the pressure at which the walls will automatically separate to discharge through the continuous peripheral outlet, tubular shafting providing an axial inlet discharging into the chamber and a baffle within the chamber for directing the flow radially outwardly toward the peripheral discharge outlet, said relatively separable walls being of shallow conical form with continuous straight sides to thereby provide a shallow conoidal closed chamber with deflecting surfaces extending in continuous straight lines from the supporting shafting direct to the peripheral discharge outlet.

10. Centrifugal separation apparatus comprising a centrifuge having a shallow conoidal separating chamber with opposed uninterrupted smooth separable walls relatively inclined to each other and toward contacting rim portions cooperating to provide a smooth unobstructed peripheral discharge outlet, means for holding the peripheral portions of the plates yieldably engaged, said means being variable in force to regulate the automatic separation of the plates under centrifugal pressure of the contents, tubular drive shafting open to the interior of the chamber and providing an axial inlet to the centrifuge, said plates being carried by the shafting and extending uninterruptedly therefrom to the peripheral discharge outlet to provide continuous flow from the center to said outlet, the means for forcing the plates together including a spring surrounding the shafting and an adjustable abutment for said spring.

11. Centrifugal separation apparatus comprising a centrifuge having a shallow conoidal separating chamber with opposed uninterrupted smooth separable walls relatively inclined to each other and toward contacting rim portions cooperating to provide a smooth unobstructed peripheral discharge outlet, means for holding the peripheral portions of the plates yieldably engaged, said means being variable in force to regulate the automatic separation of the plates under centrifugal pressure of the contents, tubular drive shafting open to the interior of the chamber and providing an axial inlet to the centrifuge, said plates being carried by the shafting and extending uninterruptedly therefrom to the peripheral discharge outlet to provide continuous flow from the center to said outlet, the means for forcing the plates together including a spring surrounding the shafting and an adjustable abutment for said spring, a baffle plate fixed on the hollow shafting within the centrifuge chamber at one side of the inlet in the hollow shaft and a substantially axial outlet from the chamber at the opposite side of said baffle plate.

12. In a separator, a relatively flat rotatable chamber formed of two conoidal casings resiliently pressed together, said chamber having an axial inlet and an axial outlet.

13. In a separator, a relatively flat rotatable chamber formed of two conoidal casings resiliently pressed together, said chamber having an axial inlet and an axial outlet, and a baffle located between said inlet and said outlet.

14. In a separator, a rotatable chamber formed of two conoidal casings resiliently pressed together, a baffle located between said casings, said casings having straight walls disposed at an angle to said baffle, and an inlet and an outlet to said chamber.

15. In a separator, a rotatable chamber formed of two casings resiliently pressed together, said chamber having an axial inlet and an axial outlet, a baffle located between said inlet and outlet, said casings having conoidal walls disposed at an angle to said baffle.

16. In a separator, a rotatable chamber formed of two plates resiliently pressed together, said chamber having an axial inlet and an axial outlet, a baffle located in said chamber, the walls of one of said plates approaching said baffle to form a constriction in said chamber.

17. In a separator, a rotatable chamber formed of two plates, said plates being so shaped at their peripheral edges that if allowed to come together they would have only a line contact with each other, and an inlet and an outlet to said chamber.

18. In a separator, a rotatable chamber having a peripheral outlet and an axial outlet, an inlet for conducting fluid into said chamber, accelerating means between the inlet and the peripheral outlet, and decelerating means between the peripheral outlet and the axial outlet.

In testimony that I claim the foregoing as my invention, I have signed my name hereunder.

WILLIAM C. LAUGHLIN.